United States Patent [19]

Fujiwara et al.

[11] Patent Number: 4,709,009

[45] Date of Patent: Nov. 24, 1987

[54] METHOD FOR THE PRODUCTION OF REFORMED P-VINYLPHENOL POLYMERS WHICH ARE LIGHTENED IN COLOR

[75] Inventors: Hiroshi Fujiwara; Tadashi Matsumoto; Masaaki Sekiya, all of Saitama, Japan

[73] Assignee: Maruzen Petrochemical Co., Ltd., Tokyo, Japan

[21] Appl. No.: 740,456

[22] Filed: Jun. 3, 1985

[30] Foreign Application Priority Data

Jun. 1, 1984 [JP] Japan ................................ 59-113556

[51] Int. Cl.$^4$ ............................. C08F 6/06; C08F 6/00
[52] U.S. Cl. .................................... 528/481; 528/486; 528/487; 528/490; 528/492; 524/87; 524/99; 524/106; 524/190; 524/251; 524/252; 524/257; 523/307
[58] Field of Search ............... 528/492, 486, 487, 490, 528/481; 525/328.8, 375, 379, 380, 381, 382; 523/307; 524/87, 99, 106, 190, 251, 252, 257

[56] References Cited

U.S. PATENT DOCUMENTS

| | | | |
|---|---|---|---|
| 3,310,541 | 3/1967 | Breuers et al. | 528/492 X |
| 3,803,113 | 4/1974 | Gluntz et al. | 528/492 X |
| 4,169,114 | 9/1979 | Cooper et al. | 528/492 X |
| 4,354,007 | 10/1982 | Scott | 525/379 X |

FOREIGN PATENT DOCUMENTS 2618145 11/1977 Fed. Rep. of Germany ...... 528/492

*Primary Examiner*—Joseph L. Schofer
*Assistant Examiner*—F. M. Teskin
*Attorney, Agent, or Firm*—Sughrue, Mion, Zinn, Macpeak, and Seas

[57] ABSTRACT

A method for the production of reformed p-vinylphenol polymers which are lightened in color comprising treating a p-vinylphenol polymer under heating at about 150° C. to about 350° C. in the presence of an amine, and if optionally, in the additional presence of an acid compound and/or a reducing agent, and if necessary, in the additional presence of an inert solvent.

18 Claims, 2 Drawing Figures

METHOD FOR THE PRODUCTION OF
REFORMED P-VINYLPHENOL POLYMERS
WHICH ARE LIGHTENED IN COLOR

FIELD OF THE INVENTION

This invention relates to a method for the production of reformed p-vinylphenol polymer which are lightened in color. More particularly, this invention relates to a method for the production of reformed polymers having equal or less coloring than that of the p-vinylphenol polymers used as starting materials, which method comprises treating p-vinylphenol polymers in the presence of an amine under heating when reformed polymers are prepared from p-vinylphenol polymers by treatment by heating under a specific condition, increasing their weight average molecular weight without too much change of their number average molecular weight, expanding their molecular weight distribution, and at the same time, producing suitable branching moieties from straight chain moieties of the p-vinylphenol polymers.

BACKGROUND OF THE INVENTION

It has been found that treatment by heating of p-vinylphenol polymers in the absence or presence of a radical initiator or an accelerator of an acid results in the weight average molecular weight of the polymers being increased without too much changing of their number average molecular weight so as to yield reformed polymers having an expanded molecular weight distribution and suitable branching moieties. These findings have been described in Japanese Patent Application (OPI) No. 58407/85 (the term "OPI" as used herein refers to a "published unexamined Japanese patent application open to public inspection").

The reformed polymers obtained by the above described method have improved processability, flexibility and the like, however, they have drawbacks in that they are deeply colored. Accordingly, it is difficult to use the reformed polymers obtained in fields where their colorings are disliked. For example, reformed polymers having a specific molecular weight and molecular weight distribution are extremely useful as photosensitive resin, particularly as microphotoresist materials. However, such polymers cannot often be used due to their color at visible and ultraviolet regions.

SUMMARY OF THE INVENTION

As a result of earnest studies, it has been found that by heating p-vinylphenol polymers in the presence of an amine, even in the presence of air (oxygen) in the reaction system, the reformed polymers having increased weight average molecular weight, expanded molecular weight distribution and suitable branching moieties are obtained without making their colors stronger. This invention has been completed based on these findings.

An object of this invention is to provide a method for the production of reformed polymers having increased weight average molecular weight, expanded molecular weight distribution and suitable branching moieties from straight chain moieties of p-vinylphenol polymers as starting materials without making their colors stronger.

Another object of this invention is to provide reformed polymers having controlled coloring which can be preferably used in fields which dislike coloring.

That is, this invention relates to a method wherein p-vinylphenol polymers can be treated in the presence of an amine under heating at about 150° C. to about 350° C. to give reformed polymers which are lightened in color.

DETAILED DESCRIPTION OF THE INVENTION

According to the method of this invention, by treating p-vinylphenol polymers in the presence of an amine, their weight average molecular weight increases without marked change of their number average molecular weight, and then it is possible to get a high ratio value of weight average molecular weight to number average molecular weight, which ratio cannot be gotten in the production of polymers by polymerization of p-vinylphenol monomers.

An increase of a weight average molecular weight is a phenomenon caused by decomposition and recombination of polymer molecules during treatment by heating. At the same time, branching moieties consisting of p-vinylphenol units arise in a main chain of the polymer molecule.

As compared with polymers obtained by polymerization of p-vinylphenol monomers having an equal weight average molecular weight to that of the reformed polymers obtained by this invention, the reformed polymers of this invention are advantageous for the following reasons.

(1) Flowability and compatibility with other polymers are improved and thus processability is excellent, (2) When used as a hardening agent for epoxy resin, the flexibility of the hardened materials obtained are excellent, (3) Coating formability and adherence to substrates are excellent, and (4) Alkaline dissolubility of a photoresist film is suitable.

Furthermore, according to the method of this invention, there are remarkable advantages. That is, the increase of the degree of coloring of the reformed polymer by heating which is caused by the prior method as described in the above Japanese Patent Application (OPI) No. 58407/85 (wherein a p-vinylphenol polymer is merely subjected to the heat treatment in the absence or presence of an accelerator of an acid without an amine) is not observed in this invention. Moreover, the degree of coloring of the reformed polymers of this invention can be controlled to lower levels than that of the p-vinylphenol polymers used as starting materials.

The degree of coloring of the reformed polymers and polymers of starting materials referred to in the present application can be quantitatively expressed by determining their absorbancies (absorptivities) at visible and ultraviolet regions.

In the method of this invention, the controlling effect on coloring, which is produced by the addition of an amine, are explained in detail as follows.

Figure 1:
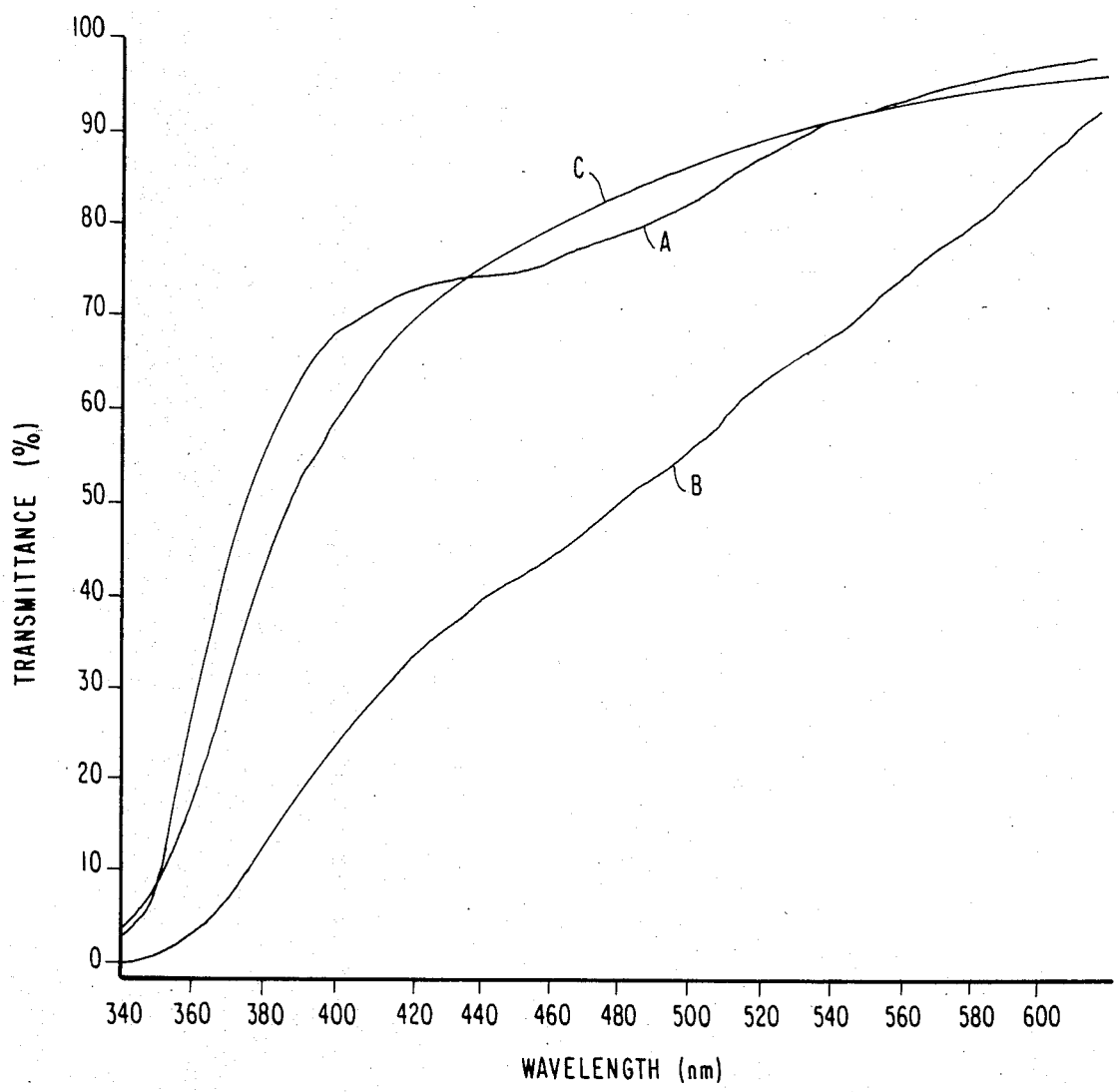
FIG. 1 shows visible absorption spectra for three kinds of a p-vinylphenol polymer, a reformed polymer prepared by treating in the absence of any amine under heating, and a reformed polymer prepared by treating in the presence of an amine under heating, each of the absorption spectra is measured by using 10 cm cell thickness at concentrations of 1 g of sample per liter.
Figure 2:
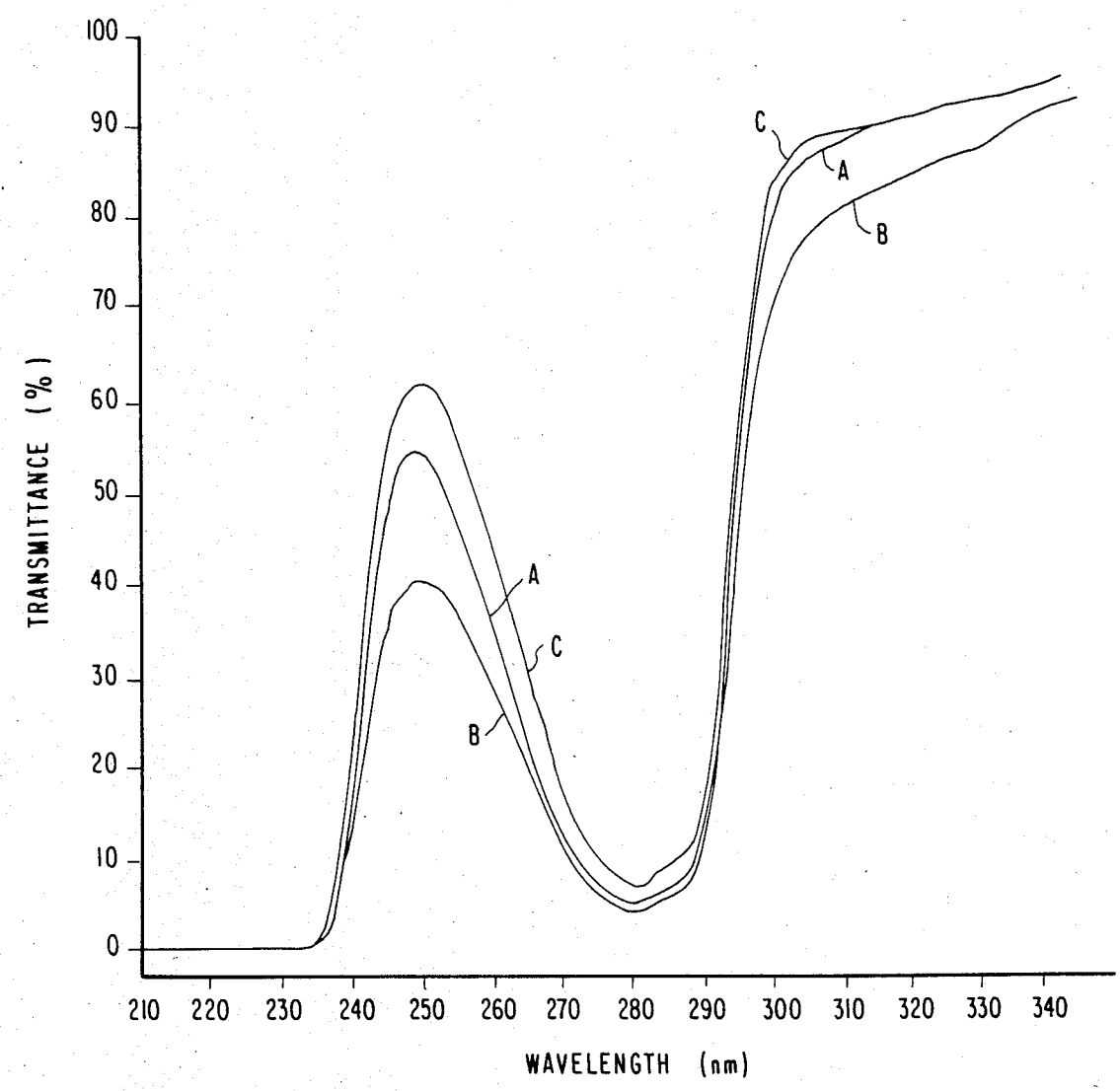
FIG. 2 shows ultraviolet absorption spectra for the same samples above, and each of the absorption spectra is measured by using 1 cm cell thickness at concentrations of 0.1 g of sample per liter. In the figures, A represents the absorption spectrum for a p-vinylphenol polymer, B represents the absorption spectrum for a reformed polymer prepared by treating under heating in the absence of any amine, and C represents the absorption spectrum for a reformed polymer prepared by heat treating in the presence of an amine.

That is, FIG. 1 shows visible absorption spectra for three kinds of p-vinylphenol polymers, a reformed polymer prepared by treating in the absence of any amines under heating, and a reformed polymer prepared by treating under heating in the presence of an amine, and each of the absorption spectra is measured at concentrations of 1 g of sample per liter of ethanol. FIG. 2 shows ultraviolet absorption spectra for the same samples, and each of the absorption spectra is measured at concentrations of 0.1 g of sample per liter of ethanol.

As is apparent from FIGS. 1 and 2, the absorbancy of the reformed polymer prepared in the absence of an amine is higher than that of a p-vinylphenol polymer used as starting materials at visible and ultraviolet regions. On the other hand, the absorbancy of the reformed polymer prepared in the presence of an amine is lower than that of a p-vinylphenol polymer used as starting materials at ultraviolet region, and in visible region both absorbancies are nearly equal. Thus, it is clearer that the addition of an amine produces a remarkably controlling effect on coloring, and further, a decreasing effect on coloring.

Furthermore, the addition of an amine has not only a controlling effect on coloring but an accelerating effect on an increase of the weight average molecular weight in the treatment by heating.

As examples of amines employed in the method of this invention, various amines having a high boiling point can be employed as follows: For example, aliphatic primary amines such as nonylamine and stearylamine; aliphatic secondary amines such as ethylhexadecylamine; aliphatic tertiary amines such as dimethyloctadecylamine; aliphatic diamines such as hexamethylenediamine and octamethylenediamine; aliphatic triamines such as triaminopropane; polyalkyleneamines such as diethylenetriamine and tris(2-aminoethyl)amine; alkanolamines such as diethanolamine, triethanolamine and 1-aminopropane-2,3-diol; imidazoles such as imidazole, 2-methylimidazole, 2-ethyl-4-methylimidazole and benzimidazole; triazoles such as triazole and benztriazole; piperidines; quinolines; lutidines; and aromatic amines such as 4,4'-methylenedianiline, β-phenylenediamine, β-naphthylamine, diphenylamine, dibenzylamine, N,N-dimethylaniline, N,N-dimethylbenzylamine, N,N-dimethyl-p-phenylenediamine and p-dimethylaminobenzaldehyde can be employed.

Of these amines, specifically aliphatic amines, alkanolamines and imidazoles particularly possess controlling and decreasing effects on coloring.

The amount of the amines used varies depending on the kind of amines used, whether the amines are used only for controlling and decreasing effects on coloring or for both of the controlling and decreasing effects on coloring and catalytic effects for increasing weight average molecular weight. In general, the amount of the amines used ranges from about 0.01 to about 10% by weight to the weight of a p-vinylphenol polymer and preferably ranges from about 0.05 to 5% by weight.

Furthermore, the method of this invention can be carried out in the presence of an acid compound having an accelerating property for reforming and/or a reducing agent such as sulfur compound in order to further accelerate decrease of coloring.

As examples of acid compounds used in this invention, inorganic acids such as sulfuric acid and hydrochloric acid; organic sulfonic acids such as benzenesulfonic acid and toluenesulfonic acid; and carboxylic acid such as maleic acid, succinic acid, phthalic acid and stearic acid are preferable. Particularly, carboxylic acids are preferable. The additional amount thereof is preferably from about 0.05 to about 5% by weight, more preferably 0.1 to 2% by weight, to the weight of a p-vinylphenol polymer used as starting materials.

As examples of reducing agents, sulfur compounds such as antimony sulfide, sodium sulfide, hydrosulfite and dodecylmercaptan and the like are preferable. The additional amount thereof preferably ranges from about 0.05 to about 5% by weight, more preferably 0.1 to 2% by weight, to the weight of a p-vinylphenol polymer used as starting materials.

At least one reason for coloring of the reformed polymer is due to the production of oxides such as quinones. The above mentioned reducing agents can prevent the production of oxides. In the method of this invention, controlling of coloring is believed to be accomplished by an antioxidating property of the amines used.

The temperature of the treatment by heating in the method of this invention ranges from about 150° C. to about 350° C. If the temperature is too low, it needs a long time to get the desired weight average molecular weight of a reformed polymer. On the other hand, if the temperature is too high, increase of the weight average molecular weight of a reformed polymer is rapid and it is difficult to control it. In an extreme case, insoluble gelatinous products are produced. When the amount of amine used is too much, the rate of increase of weight average molecular weight is up, and the selection of reaction temperature closely relates to an additional amount of the amine used.

In general, the heating temperature is preferably from about 200° C. to about 300° C. In consideration of the heating temperature and additional amount of the amine used, the treating time under heating is suitably selected to get a reformed polymer having a desired weight average molecular weight, and the treating time preferably is from about 10 minutes to about 10 hours, more preferably 30 minutes to 5 hours.

In the method of this invention, as examples of p-vinylphenol polymers used as starting materials in treatment by heating, p-vinylphenol polymers having various weight average molecular weights which can be prepared by several methods can be employed.

As is well known, a p-vinylphenol polymers can be easily prepared by polymerizing a p-vinylphenol monomer according to conventional methods, for example, method for thermally polymerizing a p-vinylphenol monomer described in U.S. Pat. No. 4,028,340 method for polymerizing a p-vinylphenol monomer in the presence of a nitryl and a cationic polymerization initiator described in U.S. Pat. No. 4,032,513, method for polymerizing a p-vinylphenol monomer in the presence of a phenol that does not have any unsaturated side chains and a polymerization accelerator described in U.S. Ser. No. 548,255, filed 11/2/83 method for polymerizing a p-vinylphenol monomer in the presence of various molecular weight regulators described in Japanese Patent Publication No. 30128/82, method for polymerizing a p-vinylphenol monomer in the presence of a radical initiator, a cation initiator, light or a radiation described in Japanese Patent Publication No. 47921/82, and method for polymerizing a p-vinylphenol monomer in the presence of various specific polymerization accelerators described in Japanese Patent Application (OPI) Nos. 44607/82, 44608/82 and 44609/82.

Furthermore, as described in U.S. Pat. No. 2,276,138, p-vinylphenol polymers can be prepared by polymerizing an acetoxystyrene monomer according to several methods, and by hydrolyzing the polymer obtained. And p-vinylphenol polymers having the weight average molecular weigth of from about 1,000 to about 100,000 can be easily prepared by selecting a method and a polymerizing condition.

In the practice of the method of this invention, as examples of p-vinylphenol polymers used as starting materials in the treatment by heating, p-vinylphenol polymers having several weight average molecular weights which can be prepared by the methods described above can be employed, but, in general, the polymers having a weight average molecular weight of from about 2,000 to about 20,000, preferably 4,000 to 10,000 are preferably employed as starting materials in the treatment by heating in view of the uses of reformed polymers obtained.

The treatment by heating of this invention may be carried out in the presence of a solvent, if necessary. As examples of the solvents used, inert solvents which have higher boiling point than the temperature of treatment by heating, and which can dissolve p-vinylphenol polymers and amines used are preferable. For example, phenols such as phenol, cresol, ethylphenol and xylenol; glycols such as ethylene glycol, propylene glycol, butanediol, pentanediol, hexylene glycol, octylene glycol, diethylene glycol, triethylene glycol, dipropylene glycol and tripropylene glycol; ethers of these glycols with a methyl, an ethyl, a propyl, a butyl group and the like; and esters of these glycols with acetic acid, propionic acid and the like can be illustrated. The amount of the solvents used preferably ranges from about 10 to 1,000% by weight, more preferably 50 to 200% by weight, to the weight of a p-vinylphenol polymer used.

The treatment by heating of this invention can be carried out under normal pressures, reduced pressures or pressurings.

The treatment of this invention can be carried out in various atmospheres. Examples of such atmospheres include air, nitrogen, hydrogen and steam, etc.

The reformed polymers of this invention can be obtained by mixing a p-vinylphenol polymer used as starting materials and an amine, and if necessary, a solvent, an acid compound having an accelerating property for reforming, and/or a reducing agent such as a sulfur compound having a reducing property, and maintaining the mixture to give a fusion or a soluble state by heating. The reaction mixture in a fusion or a soluble state is preferably stirred slowly, but the reaction mixture may be allowed to stand without stirring.

If it is necessary to remove the amine, the accelerating agent of the acid and the reducing agent used from the reformed polymer obtained, the following procedure can be employed. That is, the reformed polymer can be dissolved in a solvent such as acetone, methanol, ethanol, propanol, tetrahydrofuran, dioxane, dimethylformamide and acetic acid, and then re-precipitation can be carried out by the addition of water, benzene, toluene, xylene, hexane, petroleum ether, diethyl ether, dichloroethane or trichloroethylene. The precipitates obtained are then washed and dried.

This invention will now be explained in more detail by the following examples and comparative examples, but the following examples are only exemplifications and this invention is not limited by them.

EXAMPLE 1

100 g of a p-vinylphenol polymer (the polymer had a weight average molecular weight of 6,500, a number average molecular weight of 3,200 (the ratio of the weight average molecular weight to the number average molecular weight was 2.03), and had the number of branches per molecule of nearly zero) and 4.8 g of imidazole were placed in a 200 ml conical flask, and the mixture was heated on an oil bath with stirring at 250° C. for 4.5 hours. After cooling the reaction mixture, the reaction mixture was dissolved in 300 ml of acetone and then the solution was poured into a 1% by weight aqueous solution of oxalic acid. The precipitates obtained were collected by filtration, washed with water and then dried at about 120° C. under reduced pressure to give a reformed polymer.

The reformed polymer obtained was 95 g by weight. The weight average molecular weight and number average molecular weight of the reformed polymer obtained were determined by a gel permeation chromatography (GPC) and furthermore the number of branches per molecule was determined by a nuclear magnetic resonance spectrum. The reformed polymer obtained had a weight average molecular weight of 24,000 and a number average molecular weight of 5,400 (the ratio of the weight average molecular weight to the number average molecular weight was 4.44), and had the number of branches per molecule of 5.1 on the average.

Furthermore, the reformed polymer obtained was dissolved in ethanol, and the absorptivity of the reformed polymer obtained was determined by using a spectrophotometer. The reformed polymer obtained had absorptivities of 2,310 $cm^2/g$ and 10.0 $cm^2/g$ at 250 nm and 450 nm, respectively.

The starting material had absorptivities of 2,716 $cm^2/g$ and 12.5 $cm^2/g$ at 250 nm and 450 nm, respectively. These findings show that the coloring of the reformed polymer obtained decreases at visible and ultraviolet regions in spite of the fact that the molecular weight of the polymer increases.

Prior to the purification of the precipitates but after treatment by heating, the reformed polymer had absorptivities of 2,340 $cm^2/g$ and 9.8 $cm^2/g$ at 250 nm and 450 nm, respectively. These findings showed that decoloring could not be done during the process of purification of the precipitates.

COMPARATIVE EXAMPLE 1

100 g of a p-vinylphenol polymer which is identical with that used in Example 1 were heated at 250° C. for 4.5 hours to give a reformed polymer according to the same manner as that described in Example 1 except that the amine used in Example 1 was not employed. The reaction mixture was treated by the same manner as that described in Example 1, and the weight, weight average molecular weight, number average molecular weight and number of branches per molecule of the reformed polymer obtained were determined. The reformed polymer obtained was 96 g by weight. The reformed polymer obtained had a weight average molecular weight of 10,500 and a number average molecular weight of 3,900 (the ratio of the weight average molecular weight to the number average molecular weight was 2.69), and had the number of branches per molecule of 2.3 on the average.

Also, the absorptivity of the reformed polymer obtained was determined, and the reformed polymer obtained had absorptivities of 3,250 cm$^2$/g and 15.5 cm$^2$/g at 250 nm and 450 nm, respectively. These findings showed that the coloring of the reformed polymer was increased by the treatment by heating.

EXAMPLE 2

100 g of a p-vinylphenol polymer which is identical with that used in Example 1, and 0.2 g of triethanolamine were heated at 260° C. for 2 hours to give a reformed polymer according to the same manner as that as described in Example 1. The reformed polymer obtained was 96 g by weight. The reformed polymer obtained had a weight average molecular weight of 13,300 and a number average molecular weight of 4,200 (the ratio of the weight average molecular weight to the number average molecular weight was 3.17) and had the number of branches per molecule of 2.6 on the average. The reformed polymer obtained had absorptivity of 2,500 cm$^2$/g at 250 nm.

COMPARATIVE EXAMPLE 2

The reformed polymer prepared by the same manner as that described in Example 2 except that triethanolamine used in Example 2 was not employed. The reformed polymer obtained was 96 g by weight. The reformed polymer obtained had the weight average molecular weight of 10,100 and the number average molecular weight of 3,800 (the ratio of the weight average molecular weight to the number average molecular weight was 2.66). The reformed polymer obtained had absorptivity of 3,100 cm$^2$/g at 250 nm. As compared with Example 2, an increase of coloring of the reformed polymer was observed.

EXAMPLES 3 TO 11 AND COMPARATIVE EXAMPLE 3

100 g of p-vinylphenol polymer which is identical with that used in Example 1 and various amines were heated at 230° C. for 2 hours to give reformed polymers. The weights and properties of the reformed polymers obtained are shown in Table 1. As Comparative Example 3, the weight and properties of the reformed polymer which was prepared by the same manner as that described in Examples 3 to 11 except that the amines used in Examples 3 to 11 were not empllyed are shown in Table 1.

TABLE 1

| | Amines Used | | | Formed Polymers | | | | |
|---|---|---|---|---|---|---|---|---|
| Example No. | Compound | Amount Used (wt %)* | Weight (g) | Weight Average Molecular Weight ($\overline{Mw}$) | Number Average Molecular Weight ($\overline{Mn}$) | ($\overline{Mw}/\overline{Mn}$) | Number of Branches per Molecule | Absorptivities at 250 nm (cm$^2$/g) |
| Example 3 | Diethyltriamine | 1.7 | 97 | 12,300 | 3,600 | 3.41 | 2.5 | 2,560 |
| Example 4 | Diethanolamine | 1.7 | 96 | 9,200 | 3,550 | 2.59 | 2.2 | 2,430 |
| Example 5 | Stearylamine | 4.4 | 97 | 10,600 | 3,780 | 2.80 | 2.3 | 2,510 |
| Example 6 | 2-Methylimidazole | 1.4 | 98 | 9,300 | 3,770 | 2.47 | 2.2 | 2,250 |
| Example 7 | Ethylhexadecylamine | 3.0 | 96 | 9,100 | 3,500 | 2.60 | 2.1 | 2,450 |
| Example 8 | Dimethyloctadecylamine | 3.5 | 98 | 9,000 | 3,550 | 2.53 | 2.1 | 2,400 |
| Example 9 | Hexamethyldiamine | 2.5 | 97 | 11,500 | 3,770 | 3.05 | 2.4 | 2,380 |
| Example 10 | Triaminopropane | 1.1 | 97 | 9,700 | 3,700 | 2.62 | 2.3 | 2,550 |
| Example 11 | Benzotriazole | 3.0 | 97 | 8,500 | 3,600 | 2.36 | 1.5 | 2,400 |
| Comparative Example 3 | None | 0 | 97 | 7,000 | 3,450 | 2.03 | 1.3 | 2,900 |

*Weight percentage to p-vinylphenol polymers as starting materials

As can be seen from Table 1, an increase of the molecular weight of the reformed polymer obtained in the presence of an amine is larger than that obtained in the absence of any amine, and furthermore, the absorptivity of the reformed polymer obtained in the absence of any amine is a little larger than that of the starting material whereas the absorptivities of the reformed polymers obtained in the presence of an amine are smaller than that of the starting material, and a decreasing effect on coloring in the presence of an amine is observed.

EXAMPLE 12

100 g of a p-vinylphenol polymer which is identical with that used in Example 1, 2.4 g of imidazole and 100 g of tripropylene glycol monomethyl ester were heated at 230° C. for 3 hours. The reformed polymer obtained was 96 g by weight. The reformed polymer obtained had a weight average molecular weight of 14,000 and a number average molecular weight of 4,100 (the ratio of the weight average molecular weight to the number average molecular weight was 3.41) and had the number of branches per molecule of 2.6 on the average. The reformed polymer obtained had absorptivity of 2,450 cm$^2$/g at 250 nm.

EXAMPLE 13

100 g of a p-vinylphenol polymer which is identical with that used in Example 1, 0.3 g of triethanolamine and 2.0 g of maleic acid were heated at 230° C. for 4 hours. The reformed polymer obtained was 95 g by weight. The reformed polymer obtained had a weight average molecular weight of 22,000 and a number average molecular weight of 4,100 (the ratio of the weight average molecular weight to the number average molecular weight was 5.37) and had the number of branches per molecule of 4.9 on the average. The reformed polymer obtained had absorptivity of 2,700 cm$^2$/g at 250 nm.

EXAMPLE 14

100 g of a p-vinylphenol polymer which is identical with that used in Example 1, 2.0 g of β-naphthylamine and 0.5 g of sodium sulfide were heated at 240° C. for 3 hours. The reformed polymer obtained was 96 g by weight. The reformed polymer obtained had a weight average molecular weight of 17,500 and a number average molecular weight of 4,600 (the ratio of the weight average molecular weight to the number average molecular weight was 3.80), and had the number of branches per molecule of 3.2 on the average. The reformed polymer obtained had absorptivity of 2,500 cm$^2$/g at 250 nm.

EXAMPLE 15

100 g of a p-vinylphenol polymer which is identical with that used in Example 1, 1.0 g of triethanolamine, 1.0 g of succinic acid and 0.5 g of dodecylmercaptan were heated at 240° C. for 3 hours. The reformed polymer obtained was 96 g by weight. The reformed polymer obtained had a weight average molecular weight of 18,200 and a number average molecular weight of 18,200 and a number average molecular weight of 4,700 (the ratio of the weight average molecular weight to the number average molecular weight was 3.87) and had the number of branches per molecule of 3.3 on the average. The reformed polymer obtained had absorptivity of 2,550 cm$^2$/g at 250 nm.

EXAMPLES 16 AND 17

A p-vinylphenol polymer having a weight average molecular weight of 3,100, a number average molecular weight of 1,700 (the ratio of the weight average molecular weight to the number average molecular weight was 1.82), the number of branches per molecule of nearly zero and absorptivity of 2,550 cm$^2$/g at 250 nm was used in Example 16. A p-vinylphenol polymer having a weight average molecular weight of 20,000, a number average molecular weight of 8,700 (the ratio of the weight average molecular weight to the number average molecular weight was 2.30), the number of branches per molecule of nearly zero and absorptivity of 2,600 cm$^2$/g at 250 nm was used in Example 17. By the same manner as that described in Example 1 except that the p-vinylphenol polymers above described were used in place of the p-vinylphenol polymer used in Example 1, reformed polymers were obtained. The weights and properties of the reformed polymers are shown in Table 2.

TABLE 2

| Example No. | Weight (g) | Weight Average Molecular Weight ($\overline{Mw}$) | Number Average Molecular Weight ($\overline{Mn}$) | ($\overline{Mw}/\overline{Mn}$) | Number of Branches per Molecule | Absorptivities at 250 nm (cm$^2$/g) |
|---|---|---|---|---|---|---|
| Example 16 | 95 | 9,700 | 2,800 | 3.46 | 4.7 | 2,300 |
| Example 17 | 96 | 63,000 | 14,500 | 4.34 | 5.3 | 2,350 |

While the invention has been described in detail and with reference to specific embodiments thereof, it will be apparent to one skilled in the art that various changes and modifications can be made therein without departing from the spirit and scope thereof.

What is claimed is:

1. A method for the production of reformed p-vinylphenol homopolymers which are lightened in color comprising treating a p-vinylphenol homopolymer under heating at 150° C. to 350° C. in the presence of an amine, said amine being present in an amount sufficient to cause a lightening in color of said homopolymer.

2. A method as claimed in claim 1, wherein the amount of the amine used ranges from 0.01 to 10% by weight to the weight of a p-vinylphenol homopolymer used as a starting material.

3. A method as claimed in claim 2, wherein the amount of the amine used ranges from 0.05 to 5% by weight to the weight of a p-vinylphenol homopolymer used as a starting material.

4. A method as claimed in claim 1, wherein the amine is at least one amine selected from the group consisting of aliphatic primary amines, aliphatic secondary amines, aliphatic tertiary amines, aliphatic diamines, aliphatic triamines, polyalkyleneamine, alkanolamines, imidazoles, triazoles, piperidines, quinolines, lutidines and aromatic amines.

5. A method as claimed in claim 4, wherein the amine is at least one amine selected from the group consisting of aliphatic primary amines, aliphatic secondary amines, aliphatic tertiary amines, alkanolamines and imidazoles.

6. A method as claimed in claim 1, wherein the temperature of treatment by heating ranges from 200° C. to 300° C.

7. A method as claimed in claim 1, wherein the treatment by heating is carried out in the presence of an acid compound.

8. A method as claimed in claim 7, wherein the amount of the acid compound used ranges from 0.05 to 5% by weight to the weight of a p-vinylphenol homopolymer used as a starting material.

9. A method as claimed in claim 7, wherein the acid compound is at least one acid compound selected from the group consisting of inorganic acids, organic sulfonic acids and organic carboxylic acids.

10. A method as claimed in claim 1, wherein the treatment by heating is carried out in the presence of a reducing agent.

11. A method as claimed in claim 10, wherein the amount of the reducing agent used ranges from 0.05 to 5% by weight to the weight of a p-vinylphenol homopolymer used as a starting material.

12. A method as claimed in claim 10, wherein the reducing agent is a sulfur compound.

13. A method as claimed in claim 1, wherein the treatment by heating is carried out in the presence of both an acid compound and a reducing agent.

14. A method as claimed in claim 1, wherein the treatment by heating is carried out in the presence of a solvent.

15. A method as claimed in claim 14, wherein the amount of the solvent used ranges from 10 to 1,000% by weight to the weight of a p-vinylphenol homopolymer used as a starting material.

16. A method as claimed in claim 15, wherein the solvent used is at least one solvent selected from the group consisting of phenols, glycols, ethers and esters.

17. A method as claimed in claim 1, wherein said p-vinylphenol homopolymer is treated from 10 minutes to 10 hours.

18. A method as claimed in claim 1, wherein said p-vinylphenol homopolyumer which is treated under heating has a weight average molecular weight of from 2,000 to 20,000.

* * * * *